Patented Sept. 19, 1933

1,927,296

UNITED STATES PATENT OFFICE 1,927,296

ESTER OF THE HYDROXY FATTY ACIDS OF CASTOR OIL

Edward J. Powers, Buffalo, N. Y.

No Drawing. Application June 18, 1930
Serial No. 462,147

12 Claims. (Cl. 260—106)

My invention relates to a composition of matter comprising new and valuable acylated esters of the hydroxy fatty acids of castor oil. More specifically, my invention relates to the acetylated butyl esters of the hydroxy fatty acids of castor oil.

Castor oil contains mainly ricinoleic and isoricinoleic acids, along with smaller amounts of dihydroxy stearic and other acids. All are present in the form of their glycerides, which may be esterified directly, or the acids may first be freed and then esterified. In the former case it is more economical to treat the castor oil directly than to purify the triricinolein, or other glyceride before esterifying. If the free acids are used they may be esterified first with an alcohol, as for example, butanol, ethanol, benzyl alcohol, etc. and then acetylated with acetyl chloride or acetic anhydride. However, this process involves two steps, and utilizes relatively expensive reagents. The esters are more economically prepared by the method described in my co-pending application, Serial No. 380,762, a method which is applicable to the glycerides, e. g., castor oil as such, as well as to the free acids. The following is an example of the preparation of the acetylated butyl esters of the hydroxy fatty acids of castor oil by this process.

Equal proportions of castor oil and butyl acetate, e. g., 40 lbs. of castor oil and 35.5 lbs. of butyl acetate, are refluxed at 130–140° C. with 2% syrupy phosphoric acid or other catalyst such as sulphuric acid or sodium bisulphate. When equilibrium has been reached, as determined by analyses for volatile acid after saponification, the mixture is cooled and washed three times with saturated salt water to remove the glycerine and the catalyst. The time of refluxing will vary with the charge and other factors, but for a charge such as the above, it will usually be about two to five hours. After the mixture has been washed, the excess butyl acetate is removed by distilling at 150° C. and 15 mm. pressure. The material at this stage usually contains considerable coloring matter, so it is heated for an hour at 110° C. with a substance such as charcoal, silica gel, or filtrol, to remove the color and turbidity. After filtration a clear although not completely colorless material is obtained.

The product obtained in the manner described above contains generally about 50 to 60% of acetyl butyl ricinoleate, the remainder being unreacted castor oil, partially reacted substances such as butyl ricinoleate, and traces of free ricinoleic acid and other impurities. Acetyl butyl ricinoleate, as well as other homologous compounds may be obtained by acylating the hydroxy acid and then esterfying the product thus obtained. Or, if desired, the acid may be first esterfied and then acylated. For example, castor oil may be saponified with sodium hydroxide, the product acidified with hydrochloric acid, and the acid formed esterfied with, say, butyl alcohol, using hydrochloric acid as the catalyst. The butyl ricinoleate thus obtained may then be acylated with acetyl chloride or other homologous compounds, and the product washed with water. In order to separate the water, normal butyl alcohol may then be added and the product distilled under a vacuum up to 150° C. liquid temperature to remove the water as a component of a constant boiling mixture with alcohol. The product itself may then be distilled under vacuum. The product obtained in this manner contains about 88 to 90% of acetyl butyl ricinoleate. The material is a clear, oily liquid having a pleasant oily ester-like odor resembling somewhat in odor that of butyl acetate, but somewhat milder than that of the latter. The liquid is heat stable up to temperatures of 150° C. or somewhat higher, but at temperatures much above this point decomposition will take place due to the presence of unreacted castor oil. The properties of the product will vary slightly according to the point of equilibrium reached in the esterification, the heat treatment during the entire process and other factors. The acetyl butyl ricinoleate product prepared as described above has approximately the following properties:

Boiling range—220/235° C. at 3 to 5 m. m.
Specific gravity—0.9180 at 20/20° C.
Viscosity—70 seconds at 100° F. (Saybolt universal)
Free acidity as ricinoleic—4.05%
Free acidity as acetic—0.815.
Saponification number—$\begin{cases}260.3\\257.7\end{cases}$ 259
Combined volatile acidity—$\begin{cases}12.33\%\\12.25\%\end{cases}$ 12.29% as $CH_3CO_2H$
Flash point (open cup)—195° C.
Fire point (open cup)—225° C.
Color—light-golden yellow
Solubility in water—practically insoluble
Solubility of water in butyl acetyl ricinoleate—practically insoluble This product is compatible with the ingredients of nitrocellulose lacquers, films, artificial leather, etc., and is valuable as a plasticizer for these compositions.

Instead of reacting castor oil and butyl acetate as disclosed in the specific example above, it is obvious that I may insert therefor certain evident equivalents. For example, instead of employing the acid in the glyceride form as it occurs in castor oil, I may employ it in the acid form as either pure or impure ricinoleic acid. Instead of butyl acetate, I may employ other normal or iso-esters of either the aliphatic or aromatic series, as for example, isobutyl acetate, butyl butyrate, propyl formate, ethyl propionate, ethyl benzoate, benzyl acetate, etc. When varying the different constituents employed in the reaction, it is obvious that certain of the reaction conditions are slightly different, but it is understood that all of these changes which are evident to one ordinarily skilled in the art come within the scope of my invention.

Now, having described my invention, what I claim is:

1. As a composition of matter, the acylated monohydric alcohol esters of the mixed hydroxy fatty acids of castor oil.

2. As a composition of matter, the acylated alkyl esters of the mixed hydroxy fatty acids of castor oil.

3. As a composition of matter, the acetylated butyl esters of the mixed hydroxy fatty acids of castor oil.

4. As a compound acetyl normal butyl ricinoleate.

5. As a composition of matter, the reaction product from the heating together of castor oil and butyl acetate, in the presence of a catalyst.

6. As a composition of matter, the acylated butyl esters of the mixed hydroxy fatty acids of castor oil.

7. As a composition of matter, the acetylated normal butyl esters of the mixed hydroxy fatty acids of castor oil.

8. As a composition of matter, the acylated normal butyl esters of the mixed hydroxy fatty acids of castor oil.

9. As a composition of matter, the reaction product from the heating together of castor oil and a carboxylic acid ester of a monohydric alcohol in the presence of a catalyst.

10. As a composition of matter, the reaction product from the heating together of castor oil and a butyl ester of a carboxylic acid, in the presence of a catalyst.

11. As a composition of matter, the reaction product from the heating together of castor oil and a normal butyl ester of a carboxylic acid, in the presence of a catalyst.

12. As a composition of matter, the reaction product from the heating together of castor oil and normal butyl acetate, in the presence of a catalyst.

EDWARD J. POWERS.